(12) United States Patent
Huang

(10) Patent No.: US 7,461,429 B2
(45) Date of Patent: Dec. 9, 2008

(54) VEHICLE WINDSHIELD WIPER FOR RAIN AND SNOW DUAL PURPOSE

(76) Inventor: Shih-Hsien Huang, 7F.-2, No. 37, Jhengsin St., Zuoying District, Kaohsiung City (TW) 813

( * ) Notice: Subject to any disclaimer, the term of this patent is extended or adjusted under 35 U.S.C. 154(b) by 0 days.

(21) Appl. No.: 11/785,278

(22) Filed: Apr. 17, 2007

(65) Prior Publication Data
US 2008/0222832 A1    Sep. 18, 2008

(30) Foreign Application Priority Data
Mar. 16, 2007   (TW) ............................... 96109288 A

(51) Int. Cl.
*B60S 1/38* (2006.01)
(52) U.S. Cl. .............. 15/250.43; 15/250.44; 15/250.32; 15/250.451; 15/250.201
(58) Field of Classification Search ............. 15/250.43, 15/250.44, 250.32, 250.201, 250.451–250.453, 15/250.454, 250.361
See application file for complete search history.

(56) References Cited

U.S. PATENT DOCUMENTS

| | | | |
|---|---|---|---|
| 4,342,126 A | 8/1982 | Neefeldt | 15/250.42 |
| 4,360,941 A | 11/1982 | Mabie | 15/250.06 |
| 5,412,177 A | 5/1995 | Clark | 219/202 |
| 5,564,157 A | 10/1996 | Kushida et al. | 15/250.201 |
| 5,603,856 A | 2/1997 | Bischoff | 219/202 |
| 5,784,751 A | 7/1998 | Tippets | 15/250.04 |
| 6,049,939 A | 4/2000 | Rutkoske | 15/250.04 |
| 6,108,857 A | 8/2000 | Lee | 15/250.201 |
| 6,598,258 B2 | 7/2003 | Lee | 15/250.201 |
| 7,028,368 B2 * | 4/2006 | Lee et al. | 15/250.201 |
| 7,150,066 B1 * | 12/2006 | Huang | 15/250.201 |

* cited by examiner

*Primary Examiner*—Gary K Graham
(74) *Attorney, Agent, or Firm*—Bacon & Thomas, PLLC

(57) ABSTRACT

The present invention is to provide a "vehicle windshield wiper for rain and snow dual purpose", which comprises a bow elastic strip, some clamping devices, a strip scraper receptacle, a sheath cover, a strip scraper, two end ferrule caps and a truss saddle; Wherein, the sheath cover and two end ferrule caps totally envelope the bow elastic strip, clamping devices and strip scraper receptacle so that the snow and icy particles are blocked and separated out unable to intrude or gather in any space thereof; Thereby, the dual function of rain wiper and snow wiper of present invention eliminates the boring action in swapping between rain wiper and snow wiper during interim of snow and non-snow seasons so that it not only saves the extra expense in buying snow wiper for the consuming vehicle drivers but also totally obsoletes the conventional arm-supported snow wiper so as to eliminate the pollution burden incurred by the mass waste conventional snow wipers; Thus, it really possesses double effect in economic benefit and environmental protection.

3 Claims, 12 Drawing Sheets

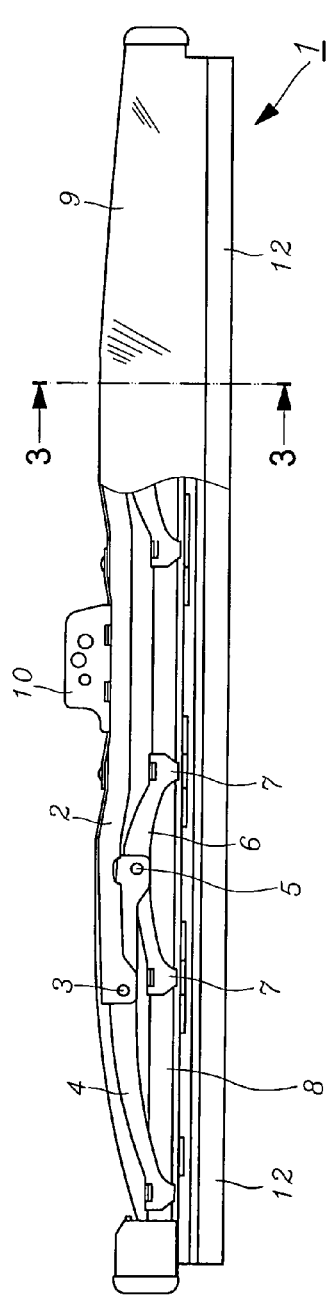
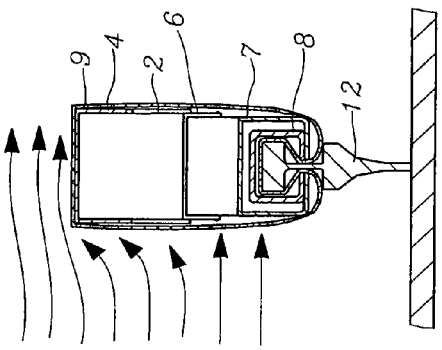
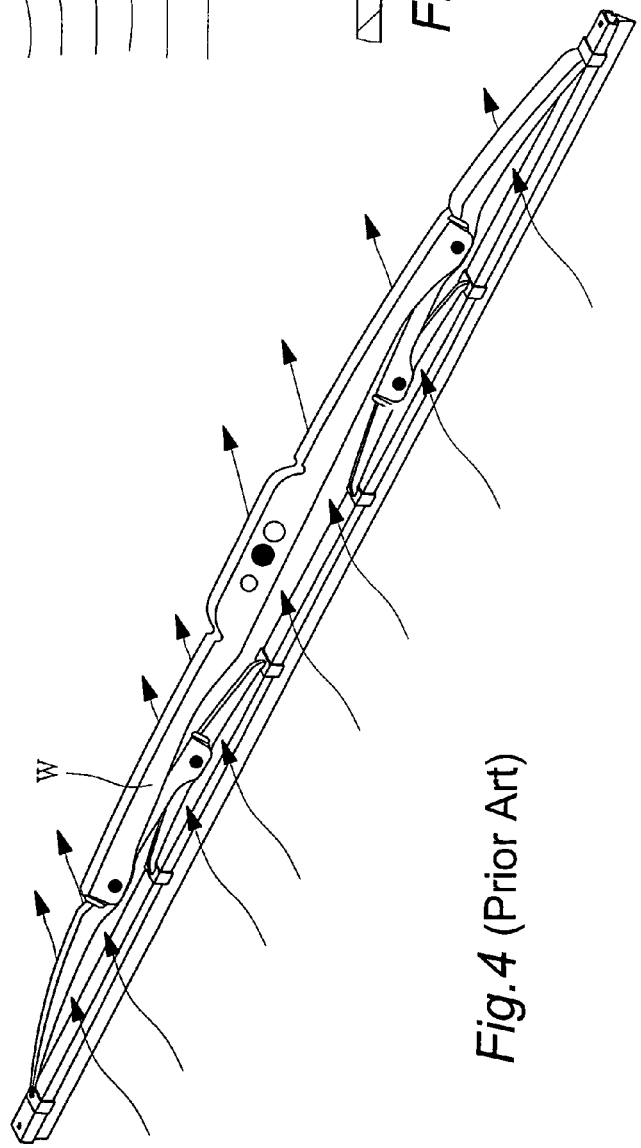
Fig.2 (Prior Art)
Fig.3 (Prior Art)
Fig.4 (Prior Art)

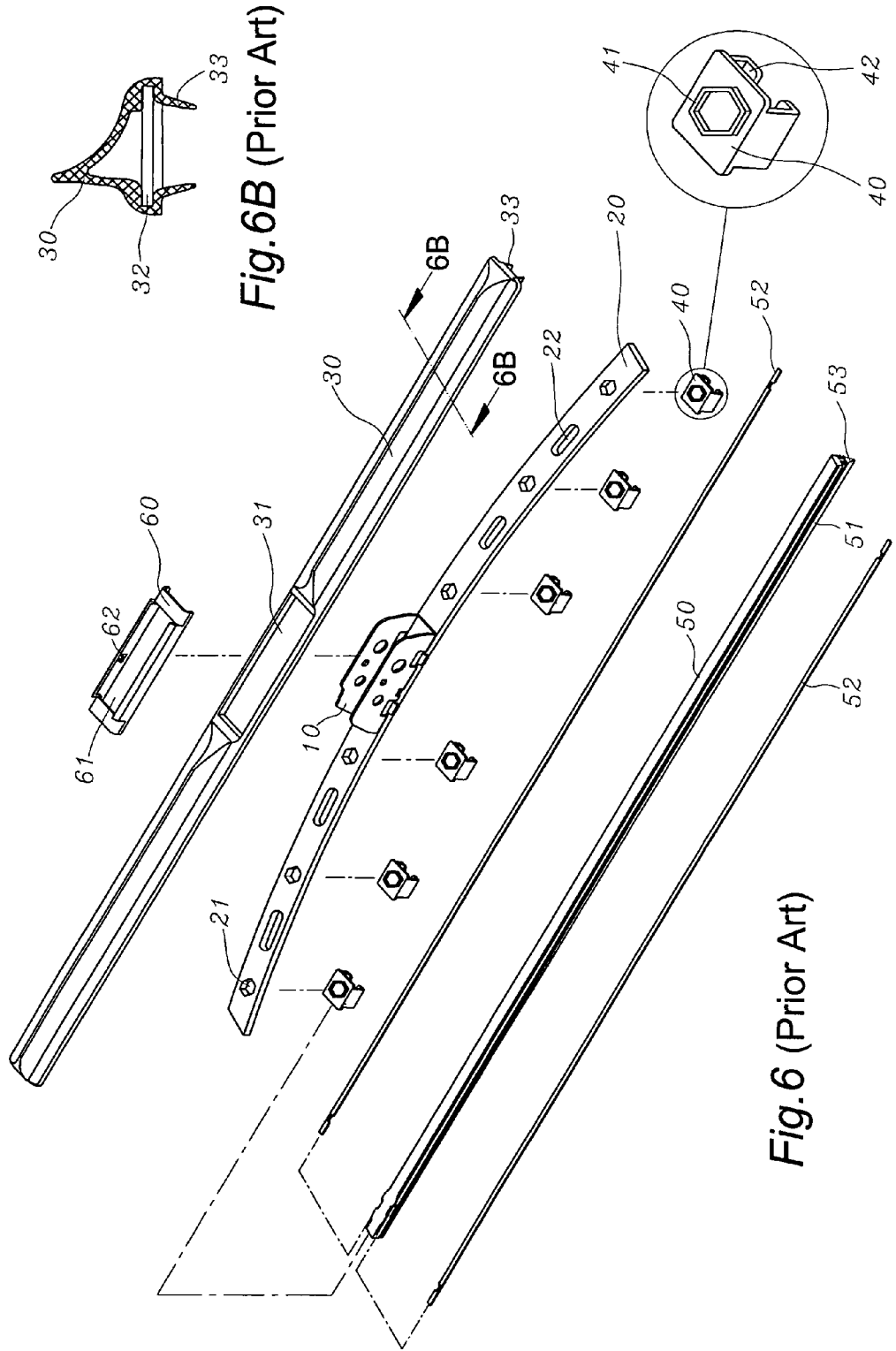

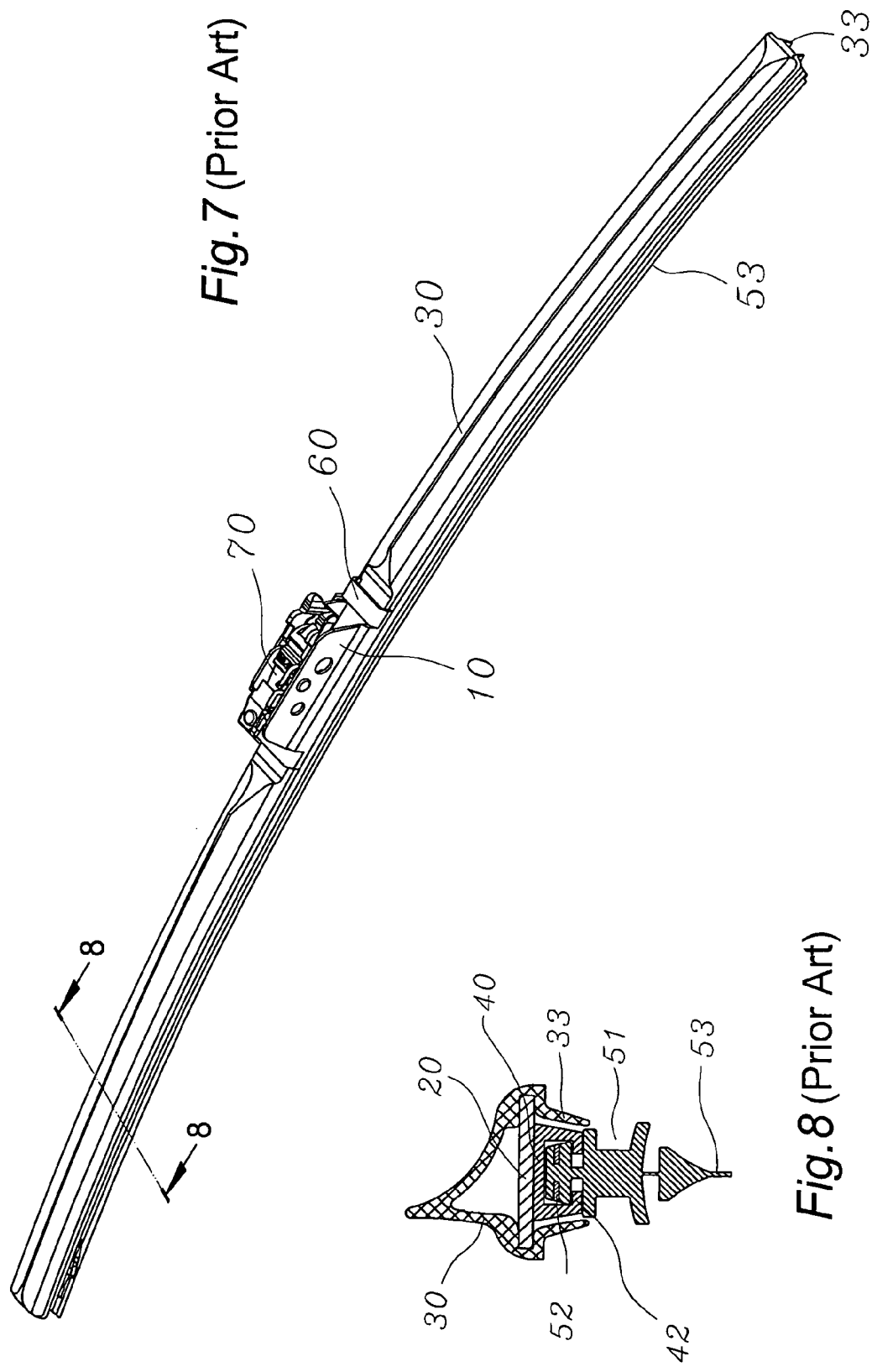

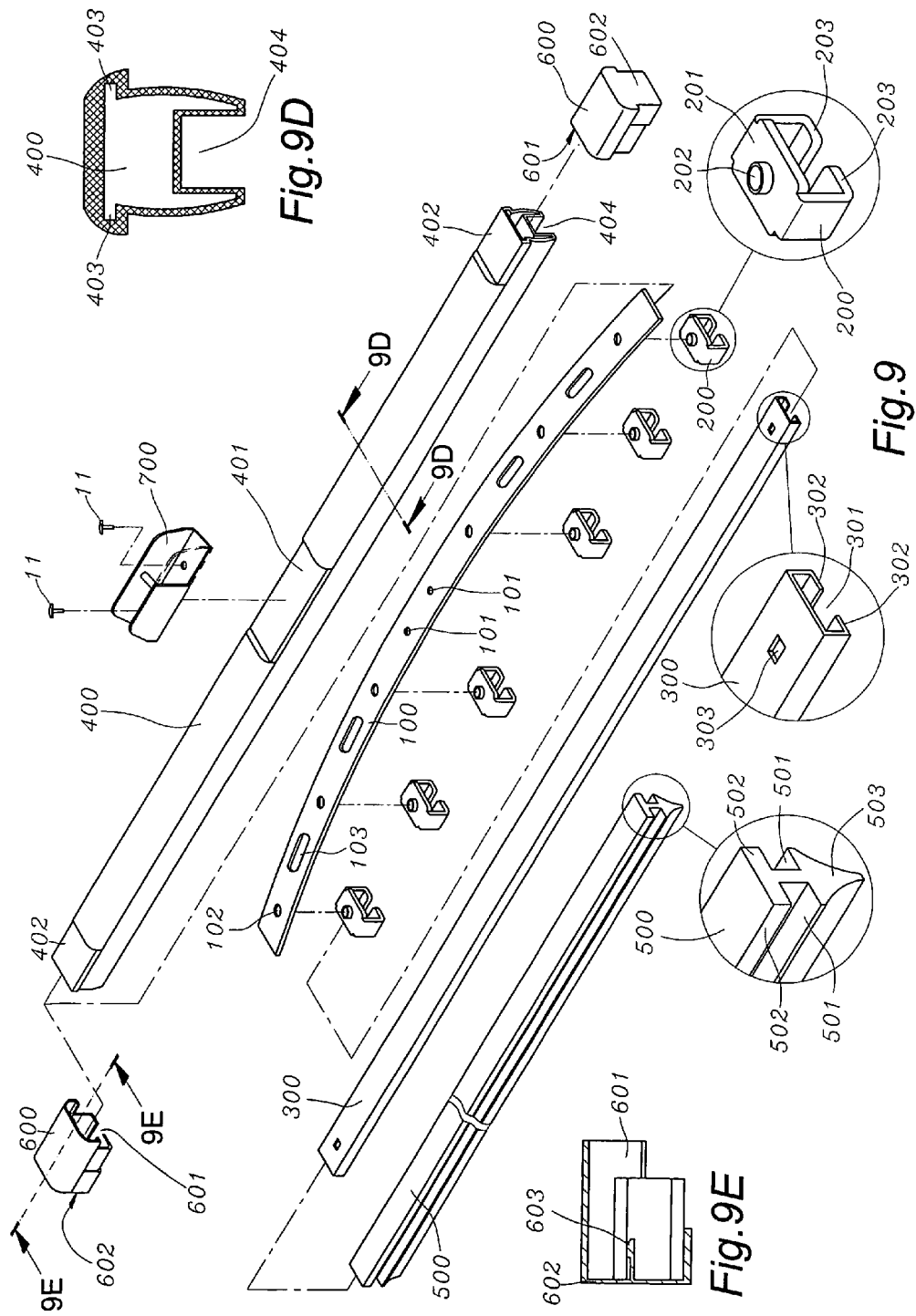

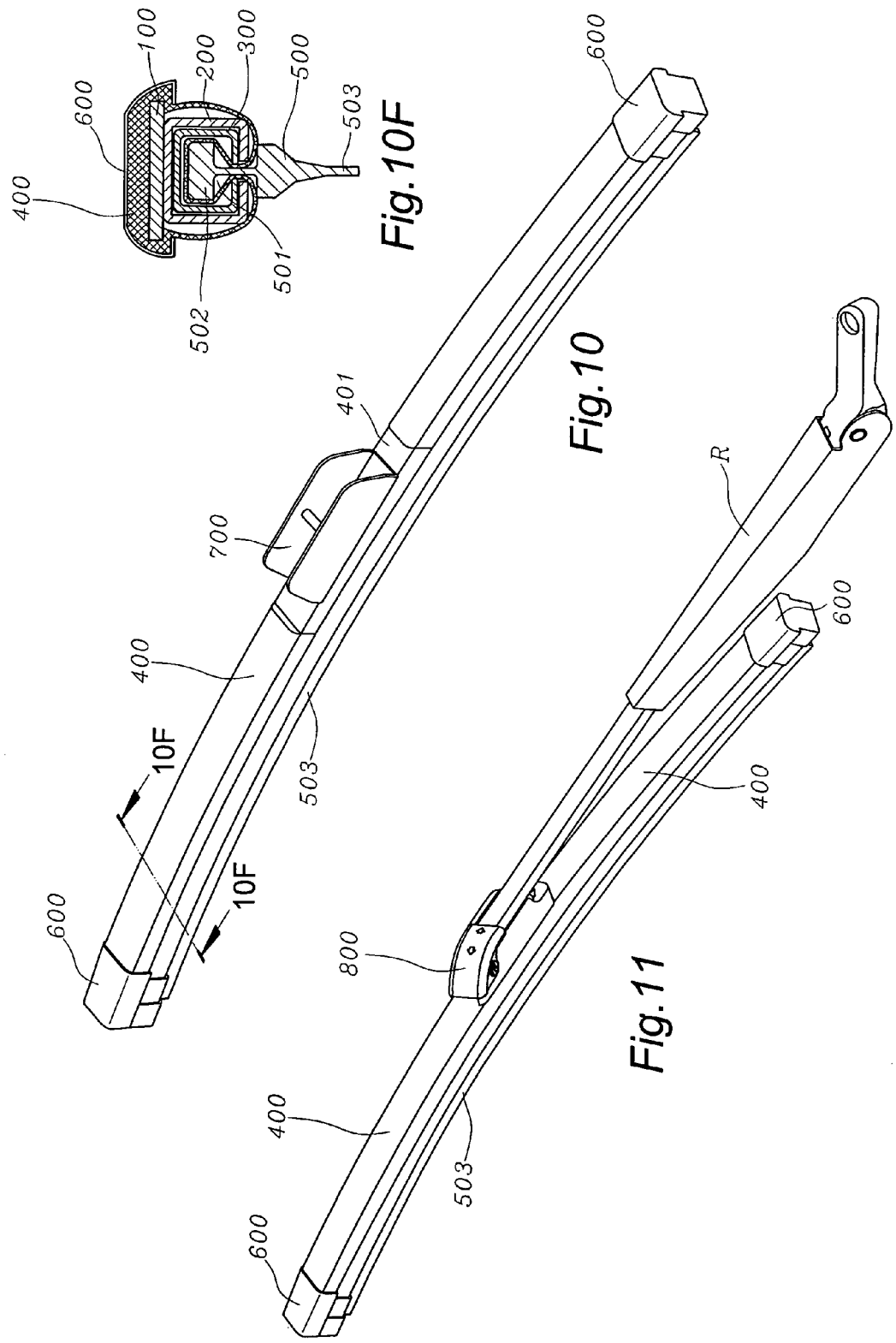

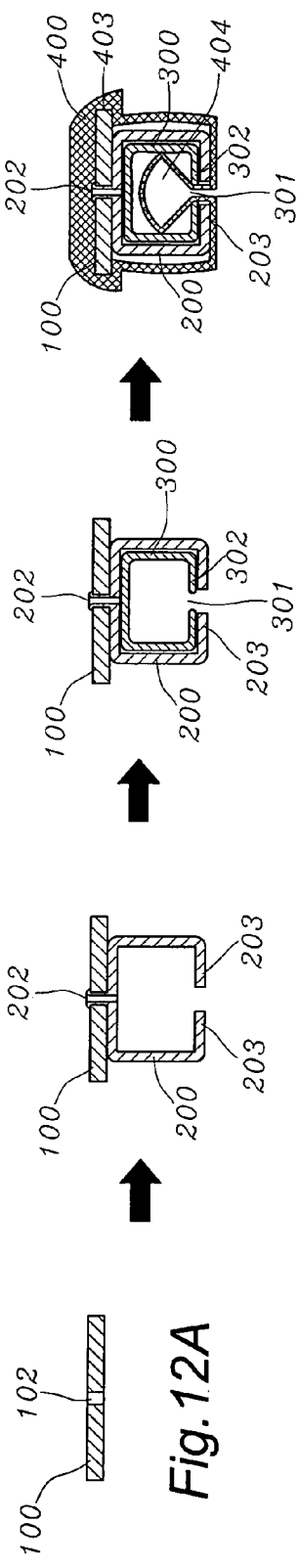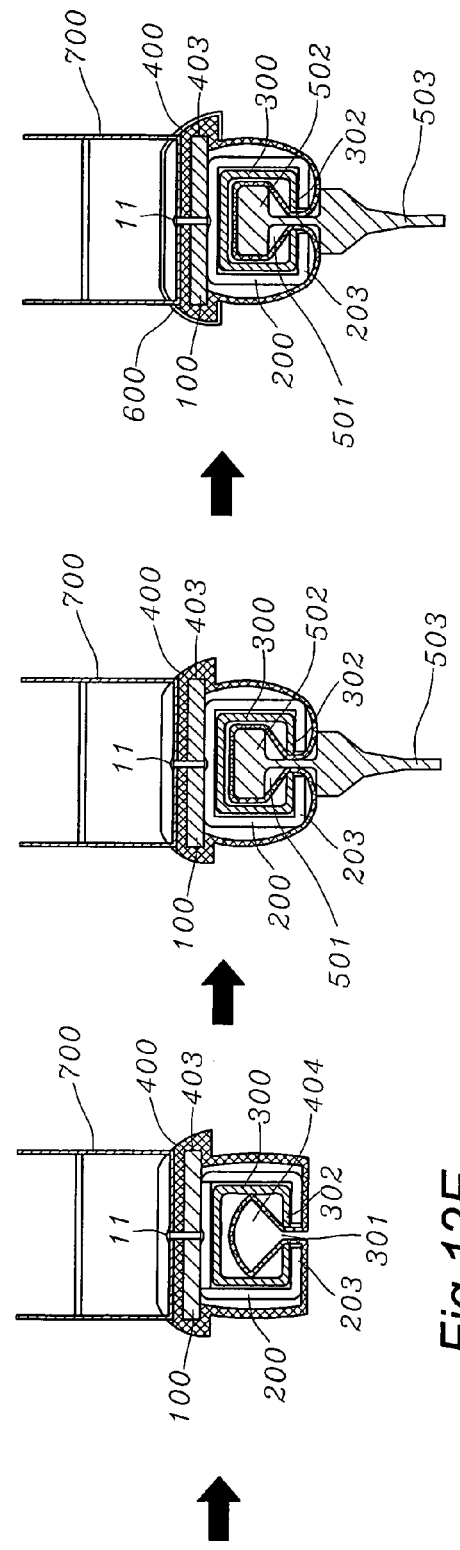

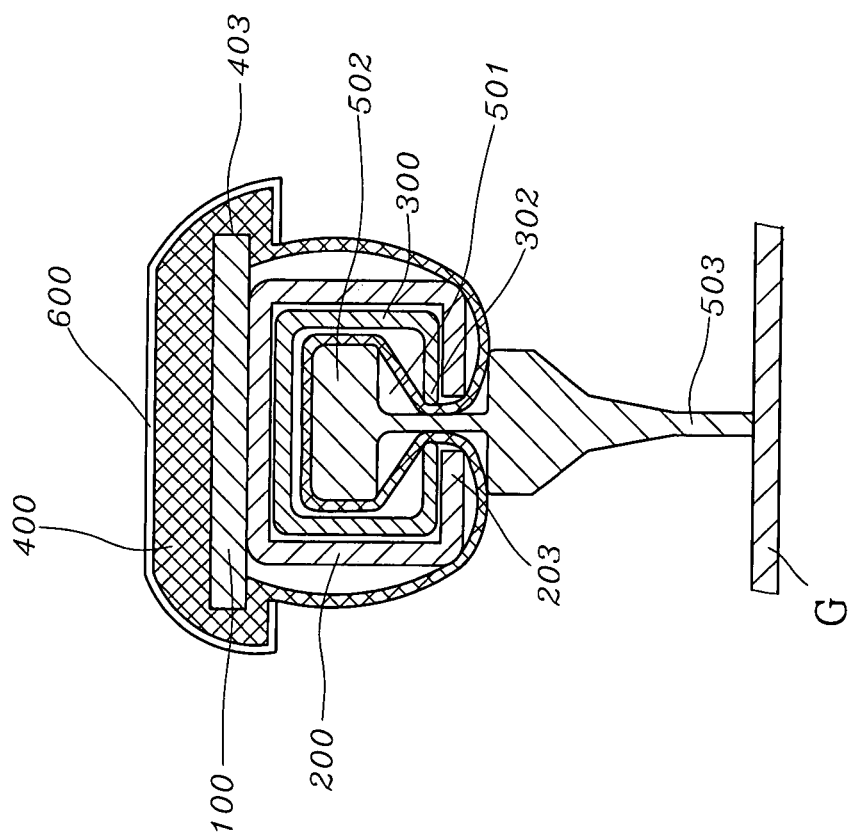
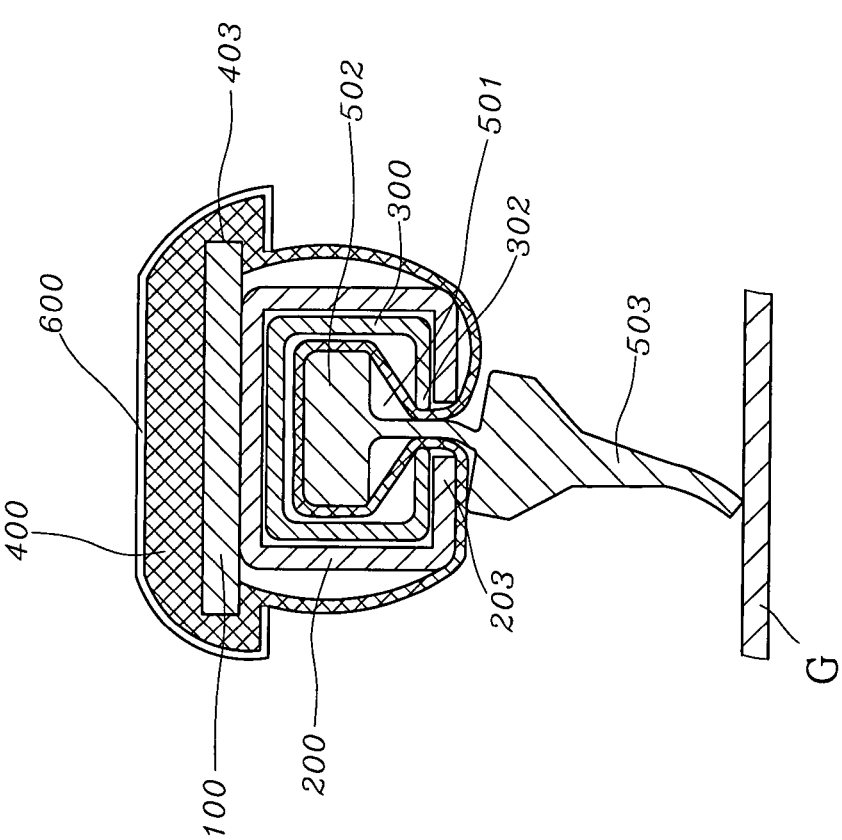

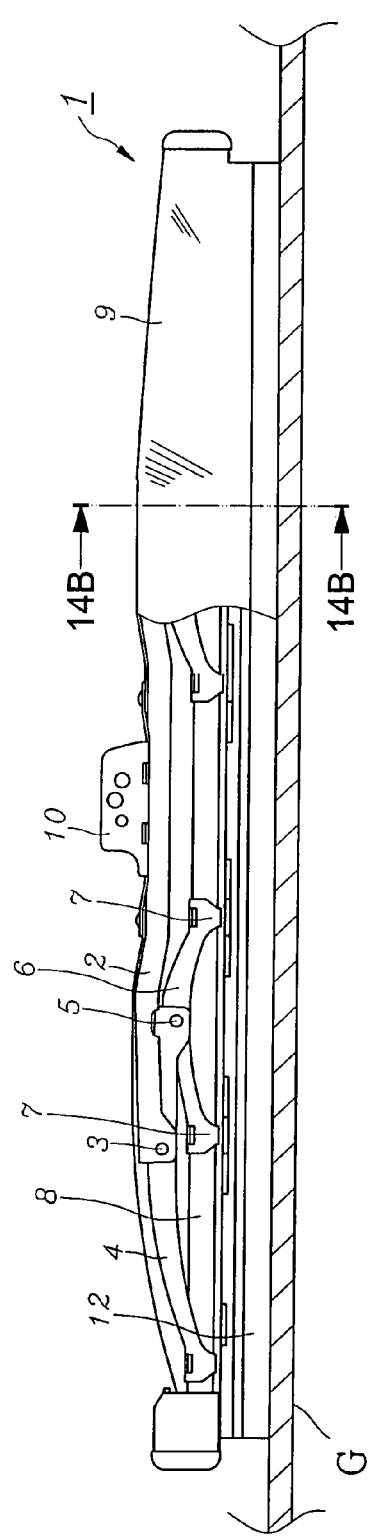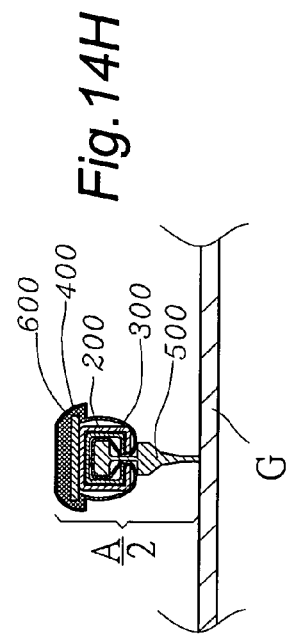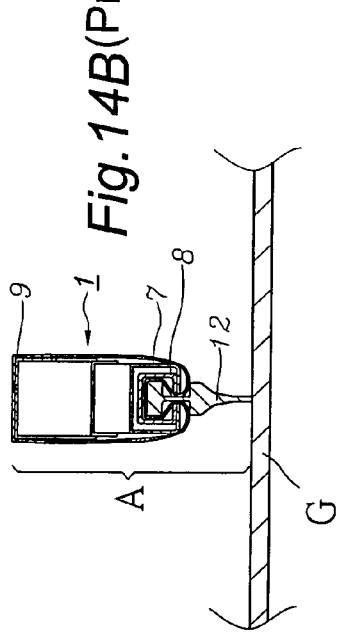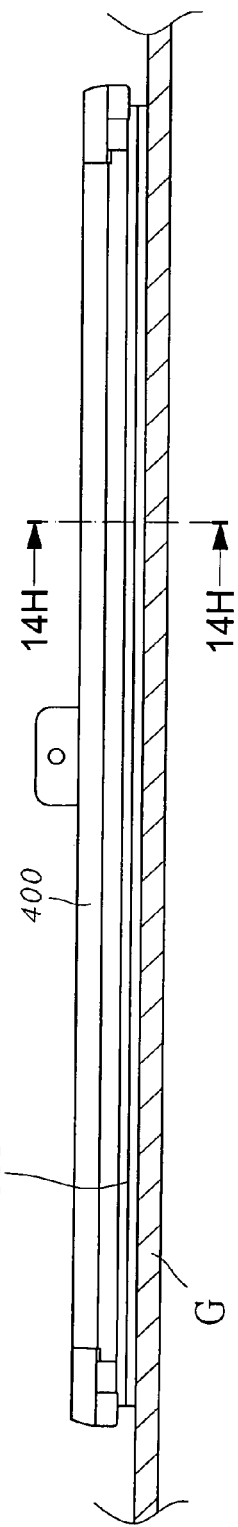
Fig.14A (Prior Art)
Fig.14B (Prior Art)
Fig.14H
Fig.14

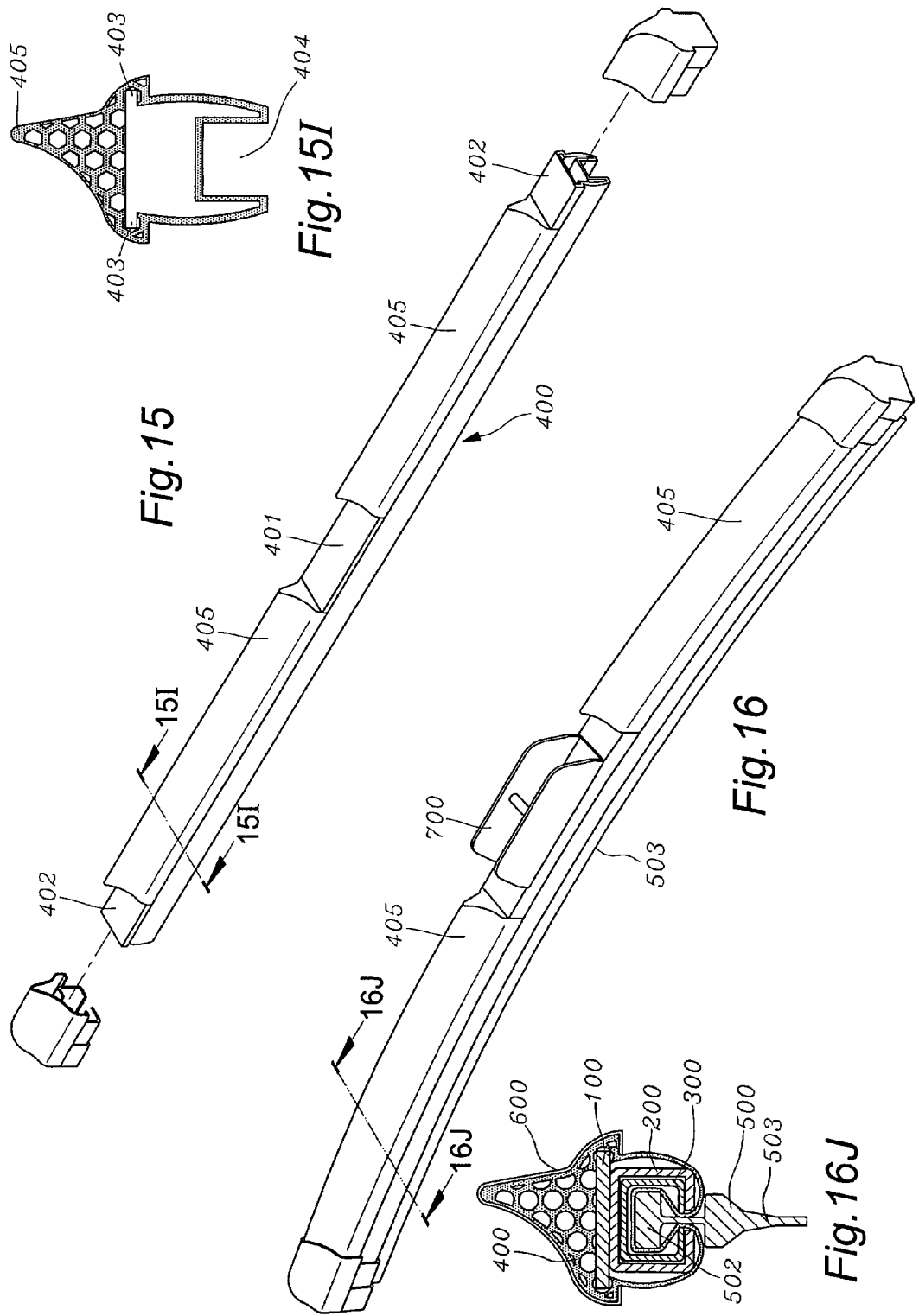

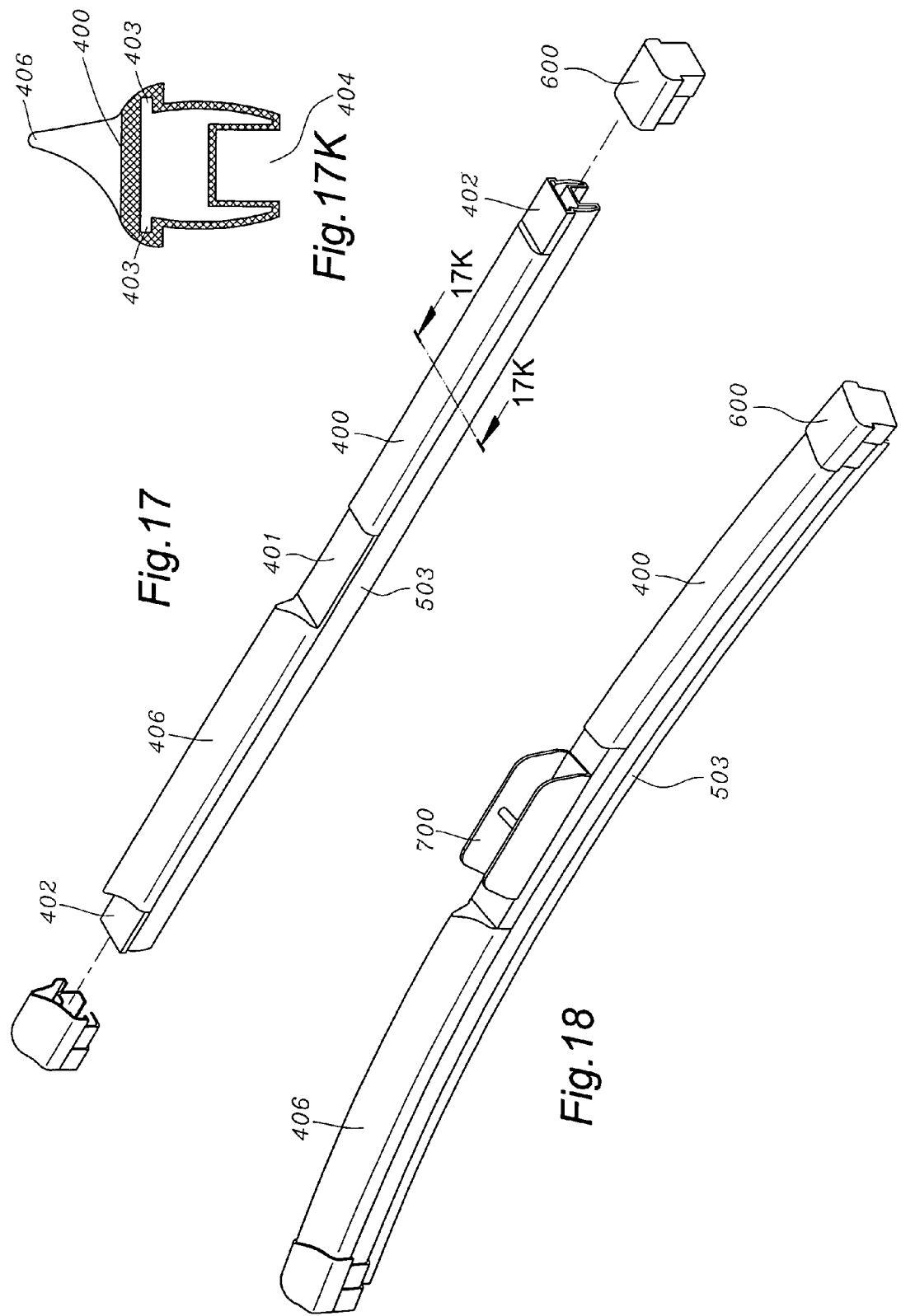

VEHICLE WINDSHIELD WIPER FOR RAIN AND SNOW DUAL PURPOSE

FIELD OF THE PRESENT INVENTION

The present invention relates to a "vehicle windshield wiper for rain and snow dual purpose", which can be universally used under any weather so that not only the swap between rain wiper and snow wiper is avoided but also the bearing area against wind flow is tremendously reduced and results in less fuel consumption due to decrease in output power of the wiper-driving motor so as to achieve double effect in economic benefit and environmental production.

BACKGROUND OF THE INVENTION

Currently, most of the structure in the windshield snow wiper for the vehicle is adapted from the conventional arm-supported wiper by wrapping a layer of external cover and inserting a strip scraper at the bottom side thereof. As shown in the FIG. 1 to FIG. 5, the conventional arm-supported snow wiper 1 comprises a master wiper support 2, a first holding support 4, a second holding support 6, an elastic strip scraper receptacle 8, a hollow tubular external cover 9, a truss saddle 10, a strip scraper 12 and two end ferrule caps 13, wherein: Both ends of said master wiper support 2 are jointed with the first holding support 4 respectively by means of the articulation 3; The second holding support 6 is jointed with each end of both first holding support 4 respectively by means of the articulation 5; And, each other end of both first holding support 4 and the both ends of each second holding support 6 is configured a clamping device 7, where the elastic strip scraper receptacle 8 is securely clamped; The hollow tubular external cover 9 first sleeves either one of both first holding support 4 up to other first holding support 4 for wrapping all holding arms therein; The truss saddle 10 is fixed on said master wiper support 2 via top center of said external cover 9 by two rivets 11; The strip scraper 12 is gripped by said strip scraper receptacle 8 after inserting therein; Two end ferrule caps 13 are used to cap on both ends of said external cover 9 respectively for retaining integral parts firmly as shown in FIG. 2 and FIG. 3; The conventional arm-supported snow wiper 1 is jointed with the wiper arm R by means of the wiper jointer 70, whereby being linked to the motor M via wiper arm linking bar S, for being used on the windshield of the vehicle as shown in FIG. 5. When the winter comes, the driver must replace the existing conventional arm-supported wiper W by the conventional arm-supported snow wiper 1 so that the snow and icy particles can not attach and gather in the space of the master wiper support 2, first holding support 4, or second holding support 6 by means of the separation and block of the external cover 9 during vehicle movement as shown in FIG. 3 so as to avoid the integral snow wiper from stiffness, which will result in losing function of scraping snow owing to the wiper scraper blade being unable to closely press against the windshield evenly. If the replacement of the wiper does not take action in time, the conventional arm-supported wiper W will become stiff and losing elasticity due to the attachment and gathering of the snow and icy particles in the master wiper support and the other holding supports and result in seriously affecting the driving safety in consequence of losing function of scraping snow on the windshield. That is the reason all the vehicle drivers in the snow area have to spend extra money to buy snow wiper for replacing the traditional rain wiper during snow season under safety consideration; contrarily, the vendors and manufacturers of the windshield wiper are happy to have increase sale volume and revenue. This unfair marketing status, the consumers are the losers and the vendors and manufacturers are the winners, always exists in the snow area so far.

As to some snow wipers in prior art such as U.S. Pat. Nos. 6,108,857 and 6,598,258 and the others, they all falls in the category of foregoing conventional arm-supported snow wiper with adoption of external cover for wrapping the wiper to block the snow and icy particles. For some other snow wipers in prior art such as U.S. Pat. Nos. 5,412,177, 5,603,856, 6,049,939, 5,784,751 and the like are different from the foregoing snow wiper of external cover, they all have additional thermal apparatus contrivance to melt the snow on the wiper by heating energy; Therefore, all such kind of snow wipers will increase the fuel expense due to extra gas consumption by the additional thermal apparatus. Moreover, in order to have such additional thermal apparatus installed in the engine compartment of limited space, not only the initial adaptation cost is considerable but also the routine maintenance fee is much; Hence, it does not appeal the consumers due to high total cost thereof and result in failing in the mainstream market without promotional effect.

These foregoing conventional arm-supported snow wiper not only have their own different weaknesses, but also have more common drawbacks as below:

(1). as shown in the FIGS. 3 and 5, although the external cover 9 wrapping on the conventional arm-supported snow wiper 1 can separate and block the intrusion of the snow and icy particles, but the long side of which will become a wind flow barrier during vehicle moving against the wind current so that the motor M, which transmits driving power to the wiper via wiper arm R and wiper arm linking bar S, will suffer a counter reaction from said external cover 9, which will lead to the increase of power output from motor M and indirectly cause the increase automobile fuel and oil costs; Contrarily, as shown in the FIGS. 4 and 5, during not winter snow season, using the conventional arm-supported wiper W, the wind flow can pass through the gaps among all arms, which means it bears less counter reaction relatively and the motor M outputs less power relatively as well as vehicle fuel will be more economical; In other words, the conventional arm-supported snow wiper 1 does more than conventional arm-supported wiper W fuel consumption; In particular, the accumulation throughout the winter snow season will be more obvious, whereas, the vehicle consuming drivers are still forced to accept it.

(2). Based on traffic safety principles, all the vehicle drivers in the snow region must spend the additional cost to buy conventional arm-supported snow wiper every year, which becomes an inevitable outcome under circumstance of no better alternative products; It is the only way to silently accept various annoyance and inconvenience coming from the replacement between the rain wiper and snow wiper.

SUMMARY OF THE INVENTION

The primary object of the present invention is to provide a "vehicle windshield wiper for rain and snow dual purpose", which comprises a bow elastic strip, some clamping devices, a strip scraper receptacle, a sheath cover, a strip scraper, two end ferrule caps and a truss saddle; By means of the bow elastic strip for replacing the holding supports in the conventional arm-supported snow wiper, then use the sheath cover and two end ferrule caps to totally envelope the bow elastic strip, clamping devices and strip scraper receptacle so that the snow and icy particles are blocked and separated out unable to intrude or gather in any space thereof; Thereby, the dual function of rain wiper and snow wiper of present invention eliminates the boring action in swapping between rain wiper and snow wiper during interim of snow and non-snow seasons so that it not only saves the extra expense in buying snow wiper for the consuming vehicle drivers but also totally obsoletes the conventional arm-supported snow wiper so as to eliminate the pollution burden incurred by the mass waste conventional snow wipers; Thus, it really possesses double effect in economic benefit and environmental protection.

Another object of the present invention is to provide a "vehicle windshield wiper for rain and snow dual purpose" without holding support so that its total size and weight is smaller and lighter than those of the conventional arm-supported snow wiper; Moreover, its bearing area against the air flow is smaller than that of the conventional arm-supported snow wiper so that the output power of the wiper-driving motor is decreased relatively and results in less gas consumption and fuel expense for the vehicles; Thus, it not only prolong the service life span of the wiper-driving motor but also tremendously reduce the vehicle-driving expense for the vehicle drivers in the snow region.

The other object of the present invention is to provide a "vehicle windshield wiper for rain and snow dual purpose" with feature of simple structure and easy production. As vehicle windshield snow wiper belongs to industrial consumable article of mass production for supplying to the demand of billions vehicle in the world, adopting and rearranging the existing equipments and facilities, which used to manufacture conventional wipers, to fabricate the wipers of the present invention saves not only the current assets but also the fixed assets in the production cost, which can be reflected in the product price for benefiting consumers to create the two-win result between the consumers and the manufacturers.

BRIEF DESCRIPTION OF THE DRAWINGS

FIG. 2 is the assembled schematic view of the conventional arm-supported snow wiper.

FIG. 3 shows a sectional view taken along the direction indicated by line 3-3 as shown in FIG. 2.

FIG. 4 is the perspective schematic view of the conventional arm-supported wiper.

FIG. 6 is the exploded perspective schematic view of the no-holding-support snow wiper.

FIG. 6B shows a sectional view taken along the direction indicated by line 6B-6B as shown in FIG. 6.

FIG. 7 is the assembled perspective schematic view of the no-holding-support snow wiper.

FIG. 8 shows a sectional view taken along the direction indicated by lines 8-8 as shown in FIG. 7.

FIG. 9 is the exploded perspective schematic view of the present invention.

FIG. 9D shows a sectional view taken along the direction indicated by line 9D-9D as shown in FIG. 9.

FIG. 9E shows a sectional view taken along the direction indicated by line 9E-9E as shown in FIG. 9.

FIG. 10 is the assembled perspective schematic view of the present invention.

FIG. 10F shows a sectional view taken along the direction indicated by line 10F-10F as shown in FIG. 10.

FIG. 11 is the perspective schematic view showing the combination of the present invention with the wiper arm.

FIGS. 12A through 12G are flow charts showing the assembly steps according to the present invention.

FIG. 13 is the section view showing the wiper presses against the windshield according to the present invention.

FIG. 13A is the section view showing the wiper brush against the windshield according to the present invention.

FIG. 14 is the schematic view showing the wiper presses against the windshield according to the present invention.

FIG. 14A is the schematic view showing the conventional arm-supported snow wiper presses against the windshield.

FIG. 14B shows a sectional view taken along the direction indicated by line 14B-14B as shown in FIG. 14A.

FIG. 14H is a sectional view taken along the direction indicated by line 14H-14H as shown in FIG. 14.

FIG. 15 is the perspective schematic view showing the second exemplary embodiment with the clad cover according to the present invention.

FIG. 15I shows a sectional view taken along the direction indicated by line 15I-15I as shown in FIG. 15.

FIG. 16 is the perspective schematic view showing the second preferred exemplary embodiment according to the present invention.

FIG. 16J shows a sectional view taken along the direction indicated by line 16J-16J as shown in FIG. 16.

FIG. 17 is the perspective schematic view showing the third exemplary embodiment with the clad cover according to the present invention.

FIG. 17K shows a sectional view taken along the direction indicated by line 17K-17K as shown in FIG. 17.

FIG. 18 is the perspective schematic view showing the third preferred exemplary embodiment according to the present invention.

DETAILED DESCRIPTION OF THE PREFERRED EMBODIMENTS

Figure 1:
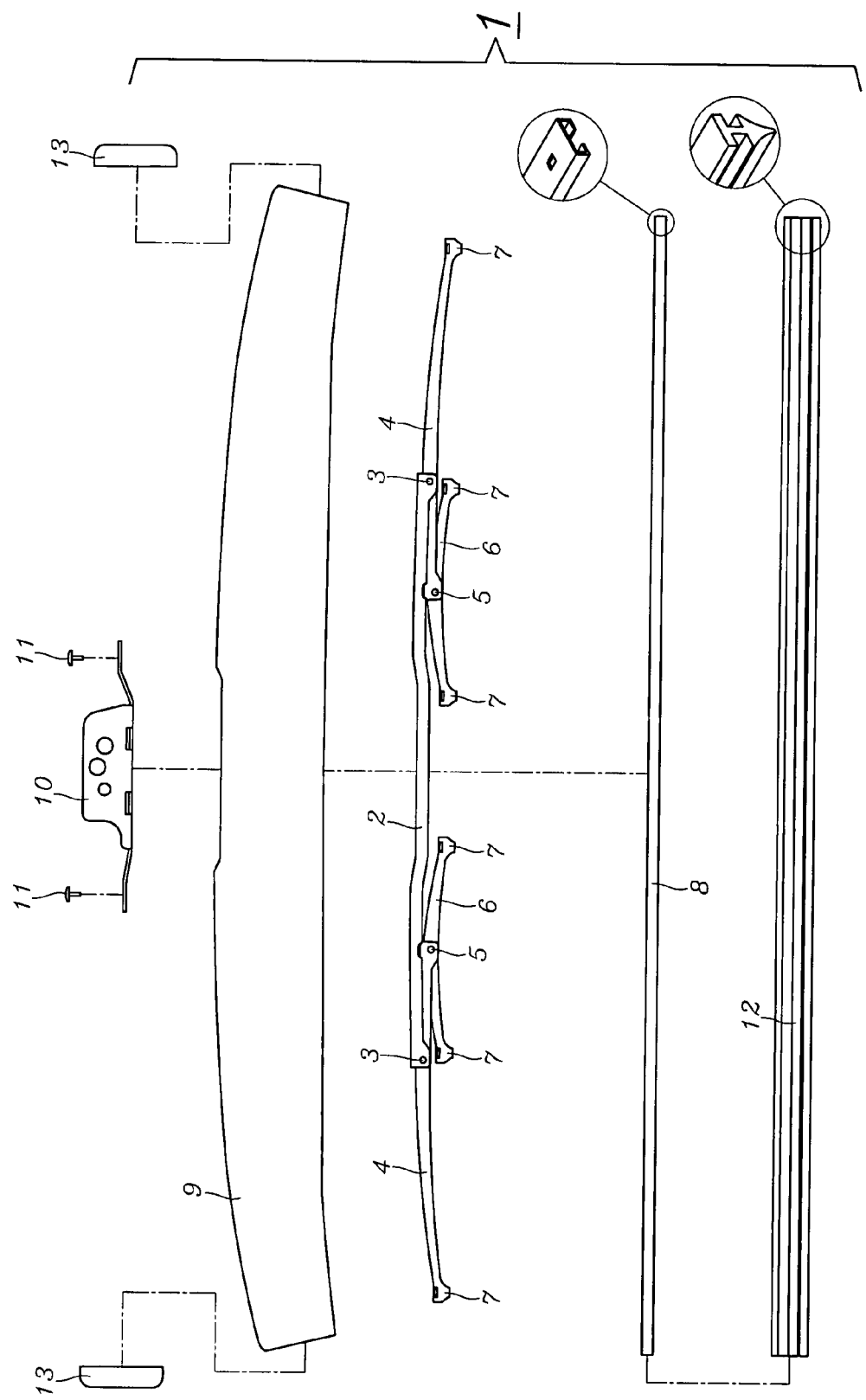
FIG. 1 is the exploded schematic view of the conventional arm-supported snow wiper.
Figure 5:
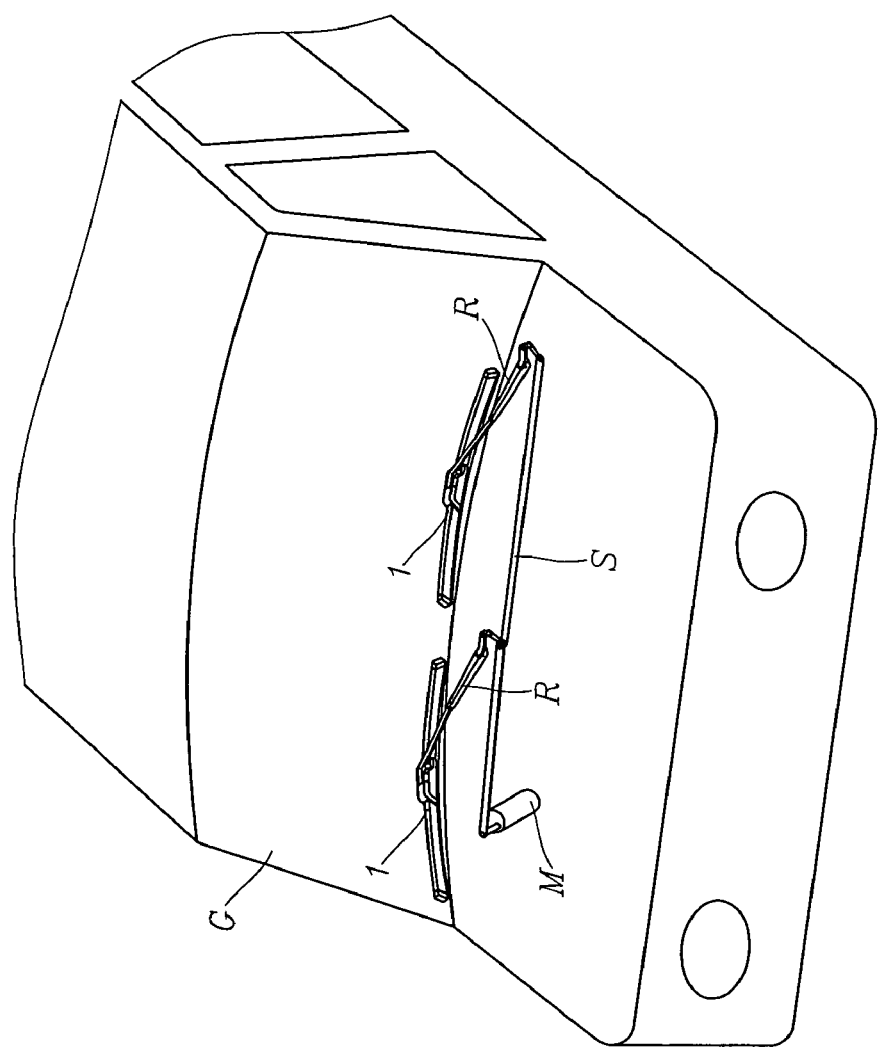
FIG. 5 is the schematic view of the conventional arm-supported snow wiper used on the windshield of the vehicle.

Prior to the description of the concrete embodiment for the present invention, it is declared that the present invention is developed from refining the drawbacks of the conventional arm-supported snow wiper together with the previous product of no-holding-support windshield wiper, which is invented by the same inventor and has being granted the U.S. Pat. No. 7,150,066, Japanese patent No. 3115053 and Taiwan patent No. M27955 respectively. The structure of such wiper is shown as in FIG. 6 to FIG. 8, which comprises:

a truss saddle 10 is to be fixed at the end of the wiper arm R by means of the wiper jointer 70;

a bow elastic stripe 20, which being made by metal stripe bow downwards, is securely jointed with the base side of said truss saddle 10 central upper side thereat; Some polygon holes 21 are evenly punched on the surface; Some oblong hollow pressure adjusting vents 22 are perforated between said adjacent polygon holes 21 with adequate aperture size for even stress distribution;

a stripe cover body 30, which being made of flexible elastic material by unitary-molding into integral body with a central rectangular hole 31 for accommodating the truss saddle 10 run through, has an elongated ridge on upper portion and a hollow middle portion with a pair of symmetrical elongated flutes 32 juxtaposed inwards at insides along both longitudinal sides as well as a pair of parallel symmetrical baffles 33 configured downwards at the bottom side of the bottom portion with upper connection with said pair of elongated flutes 32 as shown in FIG. 6B;

some detachable clamping devices 40 has a pair of parallel symmetrical bent inwards clamping angles 42 juxtaposed downwards at the bottom portion and a polygon jut 41, whose shape is similar to that of the polygon hole 21 on the bow elastic strip 20 but with slightly smaller in the aperture, configured on the upper portion;

a strip scraper 50, which being made of flexible elastic material by unitary-molding into integral body; has a pair of parallel symmetrical elongated flutes 51 juxtaposed on the upper portion for being securely inserted by said clamping angles 42 of the clamping devices 40 with a pair of parallel symmetrical metal elastic strips 52 splinted along both upper lateral sides thereof and an elongated scraper edge 53 disposed at the bottom portion; And a rectangular frame cover 60, which capping at the bottom rim of the truss saddle 10; has a rectangular hole 61 in the center and two symmetrical snap-on noses 62 juxtaposed at the bottom center along both longitudinal lateral sides.

The structure of the no-holding-support windshield wiper is contrived to employ a bow elastic stripe instead of all the holding arms used in the conventional arm-supported wiper so that whose total size is smaller and whose total weight is lighter than that of the conventional arm-supported wiper relatively; Since being introduced into the market, the no holding arm windshield wiper has being recognized and purchased by many vehicle manufacturers and a lot of consuming vehicle drivers. As to some other advantages those already described in the specifications thereof will not repeat here in redundancy.

Following is the preferred exemplary concrete embodiment in coordination with the accompanying drawings to describe the present invention; please referring to FIG. 9 to FIG. 11, the present invention of "vehicle windshield wiper for dual rain and snow purpose" comprises:

a bow elastic strip 100, which being made of elastic metal strip in shape of bow downwards, has a pair of lengthwise symmetrical rivet bores 101 punched in the center thereof and a plurality of round holes 102 punched and distributed in even space manner endwise as well as some oblong hollow pressure adjusting vents 103 perforated thereon;

some detachable clamping devices 200, which corresponding to said round holes 102 on the bow elastic strip 100, has a hollow round jut 202 with aperture being slightly smaller than that of the round hole 102 configured in the center of the top side 201 and a pair of parallel symmetrical bent inwards clamping angles 203 juxtaposed downwards at the bottom portion;

a strip scraper receptacle 300, which being made of flexible plastics by unitary-molding into integral body with shape of flat hollow bar, has a central parallel elongated gap 301 run through both ends thoroughly and a pair of parallel symmetrical bent inwards hooked jut strips 302 juxtaposed along both longitudinal lateral sides of the elongated gap 301 as well as a snap-on hole 303 is respectively punched at each end thereof;

a sheath cover 400, which being made of flexible elastic material by unitary-molding into integral body with shape of tubular hollow bar, has a flat surface formed on the upper portion with a long central attachment 401 plus two short end attachments 402 and a pair of parallel symmetrical elongated flutes 403 juxtaposed insides of both internal longitudinal lateral sides for being inserted by the bow elastic strip 100 as well as an elongated groove 404 run through both ends thereof thoroughly as shown in FIG. 9D;

a strip scraper 500, which being made of flexible elastic material by unitary-molding into integral body, has a pair of parallel symmetrical elongated groove 501 juxtaposed outwards along both longitudinal lateral sides for being inserted by the pair of said hooked jut strips 302 on the strip scraper receptacle 300 and a pair of parallel symmetrical elongated jut strips 502 juxtaposed above thereof with connection each other on the upper portion as well as an elongated scraper blade 503 in upside down ridge configured at the bottom portion;

two end ferrule caps 600, which being hollow cuboid in form of front open end 601 and back close end 602, has the sectional shape of the open end 601 been similar to but with size slightly bigger than that of the sheath cover 400 and a horizontal elastic snap-on nose 603 facing said open end 601 configured inside wall of said close end 602 as shown in FIG. 9E; and a truss saddle 700, which being used to fix on the end of the wiper arm R via a wiper jointer 800 as shown in FIG. 11, has flat bottom to closely affix on the long central attachment 401 of the sheath cover 400 and firmly riveted together with the bow elastic strip 100 by means of two rivets 11 running via the long central attachment 401 and through two rivet bores 101 in the bow elastic strip 100.

Please further refer to FIG. 9 to FIG. 12, the assembly steps of the present invention are as below:

(a) insert and pass through the hollow round jut 202 of the clamping devices 200 into the round hole 102 of the bow elastic strip 100 as shown in FIG. 12B;

(b) align the strip scraper receptacle 300 with elongated gap 301 facing downwards for directing the clamping angle 203 of the clamping devices 200, then orderly insert into clamping angles 203 up to end as shown in FIG. 12C;

(c) simultaneously align two elongated flutes 403 of the sheath cover 400 with both longitudinal lateral sides of the bow elastic strip 100 and align lower elongated groove 404 with the elongated gap 301 of the strip scraper receptacle 300 respectively, then sleeve the sheath cover 400 forwards to envelope assembly of bow elastic strip 100, clamping devices 200 and strip scraper receptacle 300 up to the end; At this moment, the elongated groove 404 of the sheath cover 400 is deformed by insetting the strip scraper receptacle 300 so that whose opening downwards is blocked and limited by the elongated gap 301 as shown in FIG. 12D;

(d) closely affix the truss saddle 700 on the long central attachment 401 of the sheath cover 400 and firmly rivet together with the bow elastic strip 100 by means of two rivets 11 running via the long central attachment 401 and through two rivet bores 101 in the bow elastic strip 100 as shown in FIG. 12E;

(e) simultaneously align two elongated grooves 501 and elongated jut strips 502 with the clamping angle 203 of the clamping devices 200 and deformed elongated groove 404 respectively, then apply force on the strip scraper 500 and pull its leading end lengthwise up to end so that entire elongated jut strips 502 are encompassed in the deformed elongated groove 404 and entire strip scraper 500 is inserted into the strip scraper receptacle 300 as shown in FIG. 10 and FIG. 12F;

(f) finally, align and cap two open end 601 of the end ferrule cap 600 with each short end attachment 402 of the sheath cover 400 until the snap-on nose 603 in the end ferrule cap 600 firmly snap on the snap-on hole 303 of the strip scraper receptacle 300 and have buckling sound heard to confirm the finish of the assembling process as shown in FIG. 10 and FIG. 12G.

As shown in the FIG. 13 and FIG. 13A, besides of the original function in scraping and wiping the rain drops on the windshield G, the present invention also has additional function in blocking and separating the intrusion of the snow and icy particles into any space of the bow elastic strip 100, clamping devices 200 and strip scraper receptacle 300 by means of the sheath cover 400 and end ferrule caps 600; thus, the elastic press of the bow elastic strip 100 can be kept well without stiff aging such that maintain the normal function in scraping and wiping the rain drops and snow particles on the windshield G of the vehicle. Moreover, the object model of the present invention has been experimental tested under simulated snow and rain weather by installing it on the real vehicle, the test result shows that it can achieve the expected functional requirement in scraping and wiping the rain drops on the windshield even under harsh circumstance. Therefore, for all vehicle drivers in the snow region, the swapping action between the traditional rain wiper and additional snow wiper can be saved in the future.

Please further refer to the FIG. 14 and FIG. 14A, owing to the bow elastic stripe 100 being the supporting skeleton of the entire wiper for the present invention in contrast with master wiper support 2, first holding support 4 and second holding support 6 for the conventional arm-supported snow wiper 1, there is not only significant difference in the total size and weight as described above but also double difference in the bearing area against the wind flow during vehicle movement; Let: the bearing area of the conventional arm-supported snow wiper 1 is "A" (as shown in FIGS. 14A and 14B), then, the bearing area of the present invention will be "(1/2)A" (as shown in FIGS. 14 and 14H). According to the pressure formula: $P=F/A$, namely $F=P \times A$; Where, P is the pressure and F is the resultant force suffered from the wind flow in kg unit. The calculating result will be: For conventional arm-supported snow wiper 1, $Fg=P \times A$ kg (as shown in FIG. 14B); For the present invention, $Fh=P \times 0.5A$ kg (as shown in FIG. 14H); Obviously, $Fg>Fh$, namely, the resultant force suffered from the wind flow of the conventional arm-supported snow wiper 1 is greater than that of the present invention. Moreover, the normal swing frequency of the wiper on the windshield is approximate 40~50 times per minute, namely, 2400~3000 times per hour, the product of resultant force Fg and Fh multiply the 2400~3000 times per hour will reflect the power output required by the motor to drive the corresponding wiper; the longer of the wiper operation, the more difference of the accumulated power consumption between these two different wipers, the more significant in the difference of fuel consumption in the vehicle. Furthermore, inferring the comparative calculation performed above to whole world, the difference of the accumulated power consumption between these two different wipers will become astonishing; Therefore, from the foregoing rough calculation, it is learnt that the contribution of the present invention in economic and environmental protection point is obvious compare to the conventional arm-supported snow wiper 1.

As shown in the FIG. 15, FIG. 15I, FIG. 16, and FIG. 16J, each outer profile of both side upper portions on the sheath cover 400 beside the long central attachment 401 can be configured into tapered curved ridge 405 respectively for having the effect in guiding air flow.

As further shown in the FIG. 17, FIG. 17K, and FIG. 18, one outer profile of both side upper portions on the sheath cover 400 beside the long central attachment 401 can be configured into tapered curved ridge 406 for having the effect in guiding air flow too.

In conclusion, basing on 20 years of the design and manufacturing experience in the windshield wiper, the inventor of the present invention realizes that better inventive product will create two-win game for both of the consumers and the manufacturers and the product of simple structure and fair price will appeal and benefit much more consumers. For the present invention, it can totally obsolete the conventional arm-supported snow wiper to avoid the environment pollution from creating mass wasted snow wipers in the future, it let all the vehicle drivers in the snow region save the extra unnecessary expense for buying additional snow wiper, it indirectly decreases the fuel consumption for the vehicle, it prolong the service life span of the wiper-driving motor, most significantly, it can be manufactured by mass production using existing equipment and facility without sacrifice in prerequisite function and quality so that the lowering of the production cost can feedback to the consumers; Hence, it totally conforms to the high criterion of environment protection, economic effect and mass production; Thus, it not only possesses innovative improvement, but also has significant contribution in the industrial application as well as conforms to the essential requirements of the invention patentability.

What is claimed is:

1. A dual purpose vehicle windshield wiper for rain and snow comprises:

a bow elastic strip, made of a downwardly bowed elastic metal strip, has a pair of lengthwise symmetrical rivet bores punched in the center thereof and a plurality of round holes punched and distributed in even space manner endwise as well as some oblong hollow pressure adjusting vents perforated thereon;

some detachable clamping devices, corresponding to said round holes on the bow elastic strip, each have a hollow round jut with an aperture being slightly smaller than that of a corresponding one of the plurality of round holes configured in a center of a top side and a pair of parallel symmetrical bent inwards clamping angles juxtaposed downwards at a bottom portion thereof;

a strip scraper receptacle, made of flexible plastics by unitary-molding into an integral body with a shape of a flat hollow bar, has a central parallel elongated gap extending through both ends and a pair of parallel symmetrical bent inwards hooked jut strips juxtaposed along both longitudinal lateral sides of the elongated gap as well as a snap-on hole respectively punched at each end thereof;

a sheath cover, made of flexible elastic material by unitary-molding into an integral body with a shape of a tubular hollow bar, has a flat surface formed on an upper portion with a long central attachment plus two short end attachments and a pair of parallel symmetrical elongated flutes juxtaposed inside of both internal longitudinal lateral sides for receiving the bow elastic strip as well as an elongated groove extending through both ends thereof;

a strip scraper, made of flexible elastic material by unitary-molding into an integral body, has a pair of parallel symmetrical elongated grooves juxtaposed outwards along both longitudinal lateral sides for by receiving the pair of said hooked jut strips on the strip scraper receptacle and a pair of parallel symmetrical elongated jut strips connected together and juxtaposed above thereof along an upper portion as well as an elongated scraper blade having a downwardly oriented ridge configured at a bottom portion thereof;

two end ferrule caps, hollow cuboid in form and having a front open end and a back close end, a sectional shape of the open end correspondingly shaped with a size slightly bigger than that of the sheath cover and a horizontal elastic snap-on nose facing said open end configured inside a wall of said close end; and a truss saddle, configured to fix the wiper on an end of a wiper arm via a wiper jointer, has flat bottom to closely affix on the long central attachment of the sheath cover and firmly riveted together with the bow elastic strip by two rivets.

2. The dual purpose vehicle windshield wiper for rain and snow as recited in claim 1, wherein, an outer profile of first and second side upper portions on the sheath cover positioned beside the long central attachment are configured into a tapered curved ridge respectively.

3. The dual purpose vehicle windshield wiper for rain and snow as recited in claim 1, wherein, an outer profile of one of first and second side upper portions on the sheath cover positioned beside the long central attachment is configured into a tapered curved ridge.

* * * * *